United States Patent [19]

Neu

[11] Patent Number: 4,809,882

[45] Date of Patent: Mar. 7, 1989

[54] DRILL DISPENSING AND TRANSPORTING APPARATUS

[75] Inventor: Horst W. Neu, Torrance, Calif.

[73] Assignee: Northrop Corporation, Hawthorne, Calif.

[21] Appl. No.: 69,344

[22] Filed: Jul. 1, 1987

[51] Int. Cl.$^4$ ............................................. B65D 83/02
[52] U.S. Cl. ...................................... 221/238; 221/254
[58] Field of Search ............... 221/254, 238, 258, 190, 221/233, 234, 179, 180

[56] References Cited

U.S. PATENT DOCUMENTS

| | | | |
|---|---|---|---|
| 714,175 | 11/1902 | Haley | 221/233 |
| 1,159,195 | 11/1915 | Eden | 221/254 X |
| 2,935,227 | 5/1960 | Swartz | 221/179 |
| 3,010,609 | 11/1961 | Jolly | 221/254 |
| 3,108,712 | 10/1963 | Hall | 221/254 X |

Primary Examiner—F. J. Bartuska
Attorney, Agent, or Firm—Terry J. Anderson; Robert B. Block

[57] ABSTRACT

Apparatus for feeding drills, one at a time, from a hopper containing a supply of drills and for feeding them to a final predetermined position. The apparatus includes a hopper assembly having a hopper for supporting the drills, a blade for lifting the drills one at a time from the supply to an upper position, and a pusher to axially transport the lifted drills to the final predetermined position. The apparatus also includes a base assembly for supporting the hopper assembly at a predetermined location and controls for sequencing the feeding of the drills.

3 Claims, 2 Drawing Sheets

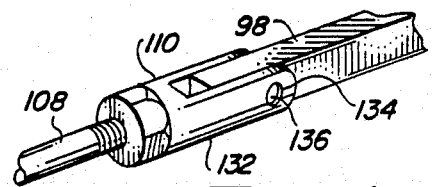
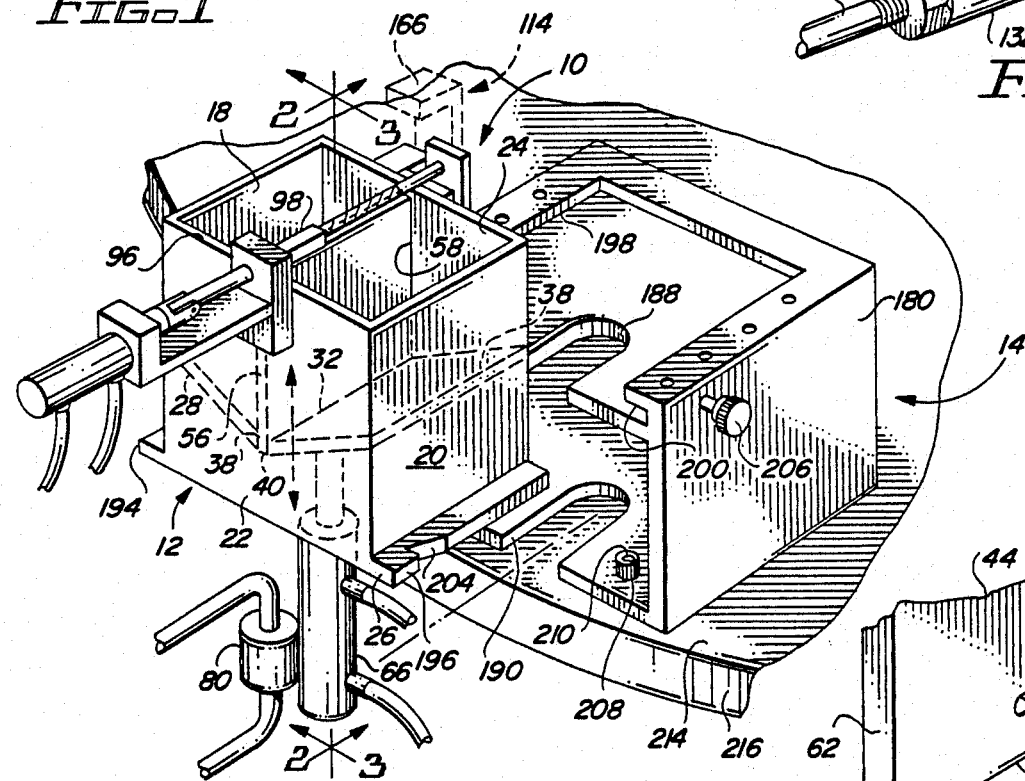
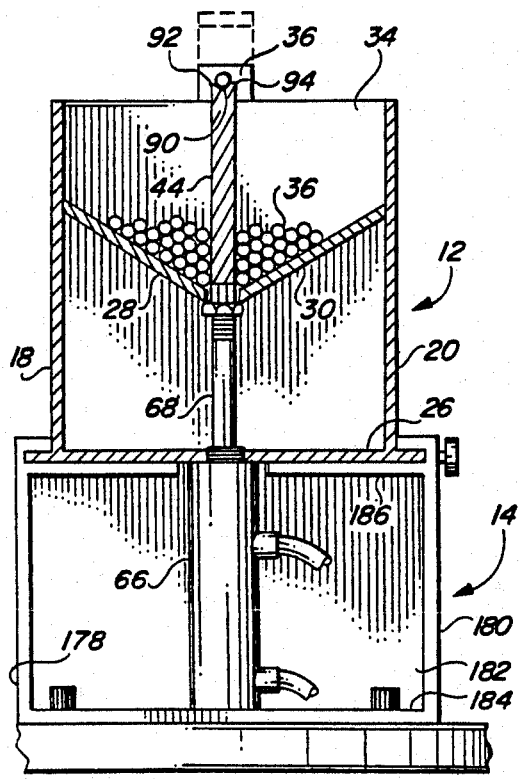
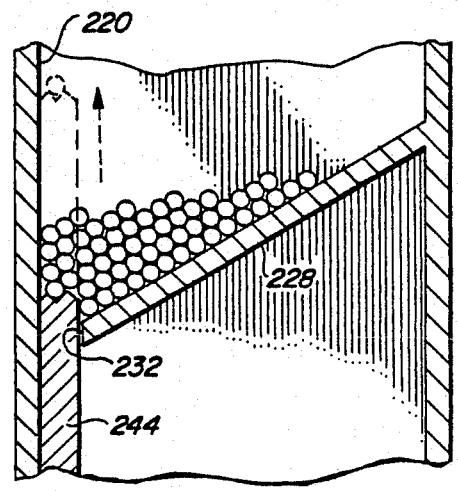

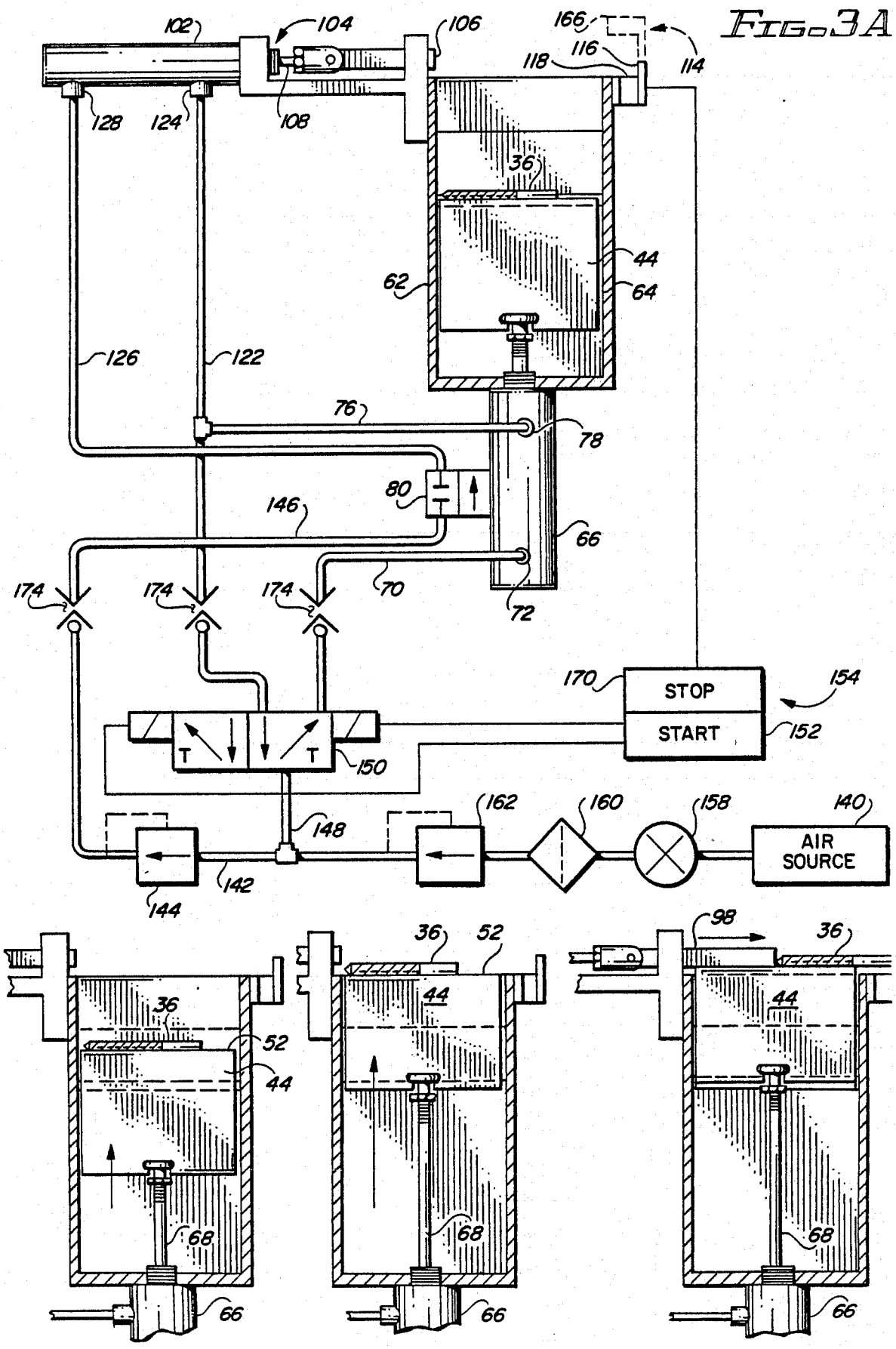

DRILL DISPENSING AND TRANSPORTING APPARATUS

BACKGROUND OF THE INVENTION

1. Field of the Invention

This invention relates generally to apparatus for dispensing essentially cylindrical objects from a reservoir containing a supply of essentially cylindrical objects and, more particularly, to apparatus for dispensing and transporting drills, one at a time, from a hopper containing a plurality of drills to a final predetermined location.

2. Description of the Prior Art

It is well known in the prior art to store a quantity of cylindrical objects, such as drills, in a reservoir or hopper and to feed or dispense such drills, one at a time, as for inspection, for repair, or for further use. Such feeding must be effected by apparatus which functions reliably each and every time, requires little or no operator involvement, always presents the drill to the same fixed position or location, and costs a minimum to fabricate as well as to operate.

A wide variety of devices of such a nature have been developed and utilized in the past in an effort to reliably, conveniently, accurately, and economically feed stored drills. By way of example, U.S. Pat. No. 4,375,854 to Hedel discloses apparatus for sorting stones which are non-cylindrical objects. The Hedel apparatus has a supply hopper and a vertically moving lift-rod for selecting a single non-cylindrical stone from a plurality of stones in the conical storage hopper. The vertically moving lift-rod raises a single stone above the hopper and into the field of view of optical inspection means. A vacuum tube at right angles to the sample lift rod can draw the sample stone into one or the other of a pair of pathways for further processing.

U.S. Pat. No. 4,480,765 to Tonus shows a supply hopper having a sloping conical base and a vertically reciprocating lift-tube to select an individual, non-cylindrical, seed or group of seeds from the hopper and raise the seed or seeds into position whereby additional apparatus may select and withdraw the seed or seeds from the reciprocating lift-tube.

In U.S. Pat. No. 2,878,963 to Bucci et al and in U.S. Pat. No. 2,914,216 to Gasparini, reciprocable supply hoppers store elongated tubular objects, cigarettes and toothpicks, respectively. The Hoppers have sloping bottom floors and a vertically moving partition which holds the objects in a surface depression on top of the partition. Downward motion of the hopper and its contents effectively positions one of the tubular items above all the other stored tubular objects in a location where it may be grasped for transfer to another location.

U.S. Pat. No. 2,964,840 to Saylor et al relates to feeding flat feed stock. The parts to be fed are initially stacked in the hopper tube and then released downwardly by gravity into a stack of parts.

Takeuchi et al, in U.S. Pat. No. 3,800,980, disclose a hopper for storing elongated tubular objects which are first loaded in a predetermined orientation and then fed, one at a time, from a slot in the lowermost potion of the hopper by means of a fluid pressure cylinder which lifts the tubular objects vertically beyond the limit of a detent.

Additionally, in U.S. Pat. No. 4,486,928 to Tucker et al, there is shown a tool storage location or rack cooperating with a complex, computer controlled robot arm which transports the tools between the storage rack and a work station.

Three additional U.S. Pat. Nos. 4,012,818 to Dornblueth et al; 4,302,144 to Hallquist; and 4,520,551 to Imhoff; all show transfer mechanisms for selecting tools such as drills from a storage magazine to a work station. All of the transfer mechanisms utilize some sort of complex, computer controlled, rectilinear movement in at least two axes.

As illustrated by the great number of prior patents, efforts are continuously being made in an attempt to solve the problem of feeding cylindrical objects, one at a time, from a hopper containing a plurality of cylindrical objects. None of these patents, however, discloses or suggests the present inventive combination of elements as disclosed herein for reliably, conveniently, accurately and economically feeding drills. The present invention achieves its purposes, objectives, and advantages over the prior art through a new, useful, and unobvious combination of elements, with a minimum number of functioning parts, at a reduction of cost for construction and operation, and through the utilization of only readily available materials and conventional components.

These purposes, objects and advantages should be construed as merely illustrative of some of the more prominent features and applications of the present invention. Many other beneficial results can be attained by applying the disclosed invention in a different manner or by modifying the invention within the scope of the disclosure. Accordingly, other purposes, objects and advantages as well as a fuller understanding of the invention may be had by referring to the summary of the invention and detailed description describing the preferred embodiments of the invention in addition to the scope of the invention as defined by the claims taken in conjunction with the accompanying drawings.

SUMMARY OF THE INVENTION

The present invention is defined by the appended claims with the specific preferred embodiments shown in the attached drawings. For the purposes of summarizing the invention, the invention may be incorporated into apparatus for dispensing and transporting essentially cylindrical objects, one at a time, from a supply of essentially cylindrical objects. The apparatus comprises a reservoir for containing a supply of essentially cylindrical objects, the reservoir being formed of a sloping floor and upstanding walls for supporting the supply of essentially cylindrical objects contained therein. The reservoir also has an elongated horizontal aperture operatively associated with the sloping floor. The lifting blade is positioned within the aperture and has an upper face to receive and support a single essentially cylindrical object from the supply of essentially cylindrical objects in the reservoir.

Means are included to reciprocate the lifting blade for transporting a single received and supported essentially cylindrical object from a lower position within the supply of essentially cylindrical objects in the reservoir to an upper position above the supply of essentially cylindrical objects in the reservoir. The upper face of the lifting blade is formed with a notch for receiving and supporting a single essentially cylindrical object and for precluding it from rolling therefrom. The sloping floor may be formed of two surfaces, each extending downwardly toward, and terminating at, the aperture, the aperture being bounded along its length by the two surfaces and along its edges by guiding grooves in the walls. In the alternative, the sloping floor may be formed of one surface, extending downwardly toward, and terminating at, the aperture being bounded along its length by the one surface and one of the walls. The means to reciprocate the lifting blade is a first pneumatic cylinder having a reciprocable piston and an attached rod and a connector secured to the rod and coupled to a lower portion of the lifting blade. The apparatus further includes a pushed secured with respect to one of the walls and being axially reciprocable from a first position generally axially aligned with an essentially cylindrical object on the lifting blade at the upper position, to a second position proximate the upper position, whereby movement of the pusher from the first position to the second position may contact and transport an essentially cylindrical object from the upper position to an axially displaced final position. The apparatus further includes a second pneumatic cylinder to reciprocate the pusher between the first position and the second position. The apparatus further includes control means to move the lifting blade from the lower position to the upper position and then to move the pusher from the first to second position whereby essentially cylindrical objects are dispensed, one at a time, from the supply of essentially cylindrical objects to the final position. The apparatus further includes a stop plate with an abutment surface to limit the movement of the pusher and the transported essentially cylindrical object upon their arrival at the final location. The apparatus further includes a base assembly fixedly positionable on a work surface and adapted to removably support the reservoir whereby the dispensed drill at the final position may be accurately located with respect to the work surface.

The invention may also be incorporated into apparatus for feeding drills, one at a time, from a supply of drills. The apparatus comprises a base assembly positionable in a predetermined location and a hopper assembly for containing a supply of drills. The hopper assembly includes two sloping floors and upstanding walls supporting the floors with the floors and the walls adapted to confine the supply of drills contained therein. The hopper assembly also includes an elongated horizontal slot in the sloping floors. The hopper assembly also includes a lifting blade slidably positioned within the slot and movable between a lower position within the supply of drills and the hopper assembly and formed with an upper edge having an elongated groove to receive and support a single drill from the supply of drills contained in the hopper assembly. The hopper assembly also includes a pusher operatively located adjacent the upper position and adapted for axial reciprocation between a first or retracted position to a second or extended position within the upper position. The hopper assembly also includes drive means to reciprocate the lifting blade for transporting single drills from the lower position to the upper position and to reciprocate the pusher from the first position to the second position for feeding a drill from the supply of drills to adjacent the upper position and then to an axially displaced final location. The apparatus also includes means to releasably couple the hopper assembly and the base assembly.

The apparatus further includes means operative against the force of the drive means to stop the movement of a drill at the final location. The apparatus further includes a space above the bottom of the base assembly and beneath the floors to receive the lifting blade when it is in the lower position. The apparatus further includes means to fixedly position the base assembly on a work surface to thereby support the hopper assembly and, consequently, a drill in the final location, at a predetermined location with respect to the work surface.

Further, the invention may be incorporated into apparatus for singly transporting drills from a supply of drills. The apparatus comprises a hopper for containing a supply of drills, the hopper being formed of an angled floor and vertical walls for confining the supply of drills contained therein. The reservoir also has an elongated horizontal opening in the bottom of the angled floor. A lifting plate is positioned within the opening and has an upper surface capable of receiving and supporting a single drill from the supply of drills contained in the hopper. First drive means are included to reciprocate the plate for lifting a single drill from a lower position within the supply of drills contained in the hopper to a higher position above the supply of drills contained in the hopper. A rod-like member is located axially offset from the higher position and adapted for reciprocation between a first or rest position to a second or activated position adjacent the higher position. Second drive means are included to reciprocate the rod-like member from the first position to the second position for advancing a drill from adjacent the upper position to an axially displaced final location. Control means are also included to actuate the first drive means and the second drive means in a predetermined sequence of operations.

The first drive means and second drive means are both pneumatic and further included are conduit means to couple the first drive means and the second drive means to a source of compressed aeriform fluid. The control means includes valve means to selectively activate the first drive means to move the lifting plate between the lower position and the higher position. The control means also includes a pressure regulator to apply a first predetermined pressure to continuously urge the second drive means to move the rod-like member from the first position to the second position. The second drive means is selectively activated to apply a second predetermined pressure, greater than the first predetermined pressure, to move the rod-like member from the second position to the first position by the means which selectively activates the first drive means to move the lifting blade from the higher position to the lower position. The control means is adapted to energize the valve means and the regulator in a predetermined sequence of operations wherein the lifting plate first moves to raise a drill from the lower position to the higher position, then the rod-like member moves to transport a drill from the upper surface of the lifting blade in the higher position to an axially offset, second or final location, and then finally the lifting plate and the rod-like member are returned to their lower and first positions, concurrently.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the present invention. It should be appreciated by those skilled in the art that the conception and the specific embodiments disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIG. 1 is an exploded perspective illustration of drill feeding apparatus constructed in accordance with the principles of the present invention.

FIG. 2 is a sectional view of the drill feeding apparatus taken along line 2—2 of FIG. 1.

FIG. 3A is a sectional view of the hopper assembly of the drill feeding apparatus taken along line 3—3 of FIG. 1 and also schematically showing the control assembly therefor.

FIGS. 3B, 3C and 3D are sectional views of the hopper assembly shown in FIG. 3A showing the lifting blade sequentially lifting a drill to the upper position and showing the pusher sequentially forwarding a drill to the final position.

FIG. 4 is an enlarged perspective illustration showing a portion of the pusher and related connector mechanisms.

FIG. 5 is an enlarges perspective illustration showing a portion of the lifting blade and related connector mechanisms.

FIG. 6 is an enlarged sectional view of a portion of the hopper assembly showing the sloping floor and lifting blade similar to that shown in FIG. 2, but illustrating a second or alternate embodiment of the invention.

Similar reference numerals refer to similar parts throughout the several drawings.

DETAILED DESCRIPTION OF THE INVENTION

Shown in the drawings, with particular reference to FIG. 1, there is illustrated drill feeding apparatus 10 formed of two major components, the hopper assembly 12 and the base assembly 14. The hopper assembly is formed of walls 18, 20, 22 and 24 upstanding vertically from a base plate 26. The walls include opposed parallel side walls 18 and 20 and opposed parallel front and back walls 22 and 24. About midpoint of the vertical extent of the walls are a pair of angled or sloping floors formed of sections 28 and 30 welded or otherwise secured to the upstanding walls. The floors slope downwardly to a slot or aperture 32 defined by the opening between the sloping floor sections 28 and 30 and the opposed side walls 18 and 20. Above the sloping floors is the reservoir or hopper 34 for receiving cylindrical objects such as drill bits or drills 36 to be stored and then singly fed or dispensed, one at a time, at the discretion of an operator.

The slot 32 extends from the front end wall 2 to the back end wall 24 and is bonded on its sides by the inner or lower edges 38 and 40 of the sloping floors. Slidingly located within the slot is a lifting plate or blade 44. The lifting plate is vertically reciprocable from a lower position whereby its upper surface or edge 52 is located beneath the supply of drills and just within the slot as shown in FIG. 3A. The lifting blade is movable to the higher or upper position above the supply of drills as shown in FIGS. 1, 2, and 3D. Whether the blade is in the upper or lower position, it will always fill the slot to preclude drills stored within the hopper from falling therethrough. The edges 38 and 40 of the floor sections 28 and 30 adjacent the slot are preferably chambered to be vertical, parallel with the movement of the lifting blade. Guidance of the lifting blade in its reciprocable path of motion is assured by parallel guide grooves 56 and 58 in the front and back end walls 22 and 24. The guide groves are of a width to slidingly accept the thickness of the vertical edges 62 and 64 of the lifting blade 44.

Motion of the lifting blade is effected by a first pneumatic cylinder 66. The cylinder has a conventional piston and an attached rod 68 so that the application of aeriform fluid such as pressurized air by a line 70 to the lower end 72 of the cylinder 66 will move the piston and rod and raise the lifting blade to the upper position as shown in FIGS. 1, 2, and 3D. The subsequent application of compressed air by a line 76 to the upper end 78 of the cylinder 66 will return the piston, rod 68 and lifting blade 44 to the lower position as shown in FIG. 5. The piston of the cylinder is conventionally coupled to an attached reciprocating rod which fixedly supports a connector 82 having and enlarged disc-shaped member 84. The disc-shaped member is received in a similarly shaped recess 86 in a central portion at the bottom of the lifting blade 44. The coupling therebetween is slightly loose for mutual lateral movement to allow for some assembly inaccuracies in the component elements to thereby assure free travel of the lifting blade without binding. These elements may be seen in FIG. 5.

The upper face or edge 52 of the lifting blade 44 is provided with a "V"-shaped notch or groove 90 along its length for receiving and supporting a single drill to be lifted, fed, and dispensed. The groove or notch is, in effect, the central part of an inverted "W"-shaped surface whereby the exterior sloping walls 92 and 94 further assist the blade in supporting a single drill to the preclusion of all other drills within the hopper during operation and use. This arrangement allows for the handling of a wide variety of drill diameters as well as lengths which might be stored in the hopper 34. This arrangement also precludes the supported drill from rolling from the lifting blade back into the supply of drills in the hopper when being transported. In addition, the drill in the notch being lifted by the blade will resist rotation and its upper surface will thus act similarly to the edge of a knife in separating and moving through the stacked plurality of drills above it.

Coupled with respect to the upper end 96 of the reservoir or hopper 34, and attached to the front wall 22, is a pusher 98 formed as a rod-like member and a second pneumatic or pusher cylinder 102 supported within a pusher guide assembly 104. The pusher guide assembly is welded or otherwise secured adjacent the upper surface of the front wall and includes a guiding aperture 106 through which the pusher 98 may reciprocate for pushing drills. In its retracted, rest, or first position as shown in FIG. 3B the pusher is withdrawn and out of the path of motion of the lifting blade and drill. When the lifting blade and supported drill are in their upper positions, the drill is essentially axially aligned with the pusher 98 and the pusher cylinder 102. The pusher cylinder includes a conventional reciprocable piston and an attached rod 108 and an attached connector 1 10 adapted to move the pusher axially to first contact and then transport a drill at it supper position to a final axially offset position or location as shown in FIG. 3D. In the second or final position, the forward end of the drill is in contact with a drill stop assembly 114 which has an abutment surface 116 to limit the axial movement of both the drill as well as the pusher. A ledge 118 on a horizontal support surface of the drill stop assembly may provide support to the forward end of the drill in the final position. The adjacent rear end plate provides support for the control end of the drill at the final position. The majority of the drill continues to be supported by the lifting blade.

Movement of the pusher 98, along with its piston, attached rod 108 and attached connector 110, to the retracted position is preferably coincident with the retraction of the lifting blade 44, along with its piston, rod 68 and connector 82 from the upper to the lower position. This return movement of the piston of the pusher cylinder 102 and, therefore, the pusher 98 is effected through a line 122 which is common with the line 76 to provide compressed air to the front end 124 of the pushed cylinder 102 and the top end 78 of the lifting cylinder 66. Movement of the pusher 98 and its rod and piston from the retracted position to the advanced position is affected through a line 126 to the back end 128 of the pusher cylinder 102.

FIG. 4 illustrates the rod or pusher 98, the pusher cylinder rod 108, and the connector 110 therebetween. The connector is threadedly engaged to the exterior end of the pusher cylinder rod 108. The outboard end of the connector is provided with a clevis 132 with apertures 134. A pin 136 is received within the apertures 134 of the clevis 132 and pusher 98 to provide a loose fit to allow movement of the pusher with regard to the pusher cylinder rod 108. The loose connection has been found to offer a superior alignment between the pusher 98 and drill 36 being transported thereby.

Both the lift cylinder 66 and the pusher cylinder 102 are energized by controls to provide aeriform fluid, preferably air under pressure from a common source 140, to the cylinders in a predetermined program. Air is fed through a line 142 to a pusher regulator 144 to advance the pusher cylinder piston and through a line 148 to a solenoid operated four-way valve 150 and then through lines 70 and 76 to the top and bottom ends of the lift cylinder to control the raising and lowering of the lift blade 44 and through a common line 122 to the front of the pusher cylinder 102 for the retracting of the pusher 98. The pusher regulator precludes the supplying of excess air pressure to the back end 128 of the pusher cylinder and limits the pressure of the pusher 98 and transported drill 36 against the abutment surface 116 to effect its stoppage at a predetermined location or position regardless of the length of the drill.

Operation and use of the apparatus is initiated by a START signal 152 on the control assembly 154. This energizes the solenoid operated four-way valve to sequence it from a first, or inactive, position to a second position which allows the flow of compressed air along a first line 70 to the bottom end 72 of the lift cylinder 66 to raise the lifting blade 44 and a single supported drill 36 to the upper position. The pressurized air is from a source 140 which directs the air through a valve 158, filter 160 and a second pressure regulator 162 in a conventional manner. Regulator 162 controls the overall system pressure to lift cylinder 66 as well as controlling the return stroke of the pusher cylinder 102 through line 122. Secondary regulator 144 controls only the pushing pressure of cylinder 102 and thereby the force applied to the drills 36. Primary pressure regulator 162 is the first in line and secondary pressure regulator 144, therefore, can not have a higher pressure than regulator 162, being dependent on the setting of the primary pressure regulator 162. Because of this relationship, pressure regulator 162 may be considered the primary regulator while regulator 144 may be considered the secondary regulator.

Upon the lifting blade 44 reaching its topmost position, valve 80 is activated to allow air to move through lines 146 and 126 to drive the pusher rod 10 forward and the drill to the final location. The front end 124 of cylinder 102 and the top end 78 of cylinder 66 are not receiving air at this time because of the orientation of valve 150.

A detector, such as an optical detector 166, signals the presence or absence of the transported drill at the final location. After the drill has been removed from the final location, the optical detector directs a signal to the control assembly to move the valve 150 to a position whereby compressed air is provided through a line 76 to the upper end 78 of the lift cylinder 66 to lower the lift blade 44 and also along a line 122 to the front end 124 of the pusher cylinder 102 to retract the pusher 98. This position of valve 150 removes the application of compressed air to the lower end of lift cylinder 66. The lowering of the lift blade inactivates valve 80 to remove air pressure from back end 128 of cylinder 102. The force of air at the rear of cylinder 102 has been exhausted at this point and no net force is left in the forward direction. Also, as referred to above, the solenoid valve 150 is a two position, four-way valve with only two working positions that either advance or retract the two cylinders. In the upstroke of cylinder 66, the air flow to cylinder 102 is blocked until cylinder 66 reaches the end of its stroke and pusher 98 does not advance until the blade 44 and drill 36 are at the proper level for pushing the drill to the stop assembly.

Such actions return the piston of the lift cylinder 66 and consequently the lift blade 44 to the lower position while retracting the pusher piston and pusher 98 rearwardly. When programmed with respect to a system for moving drills from the final position to beyond, the controller assembly may then automatically feed the next drill. This action would be continuous and automatic until activation of a STOP signal 170 from the control assembly 154 or until the supply of drills in the hopper is exhausted. In the alternative, each individual drill feed may be initiated manually by an operator through the control assembly.

In a further alternate embodiment, the drills could be merely fed away from the final position as by gravity or by a conveyor of any sort. In such case the program for controlling the apparatus would be continuous, preferably on a totally timed controller. In any of these embodiments, the controller could be programmed to generate a signal to the operator in the event of two or more cycles not feeding a drill in the event of drill depletion or a malfunction.

The various lines and pneumatic components include quick release coupling 174 to facilitate repair or replacement of parts as may be required.

As can be understood, the upper edge of the blade when beginning its upward travel will receive a lowermost drill from within the reservoir or hopper. New drills are added to the hopper through the opening at the top. The action of blade 44 rising and falling through a quantity of drills or other rods will cause mixing of the drills or rods. This is especially true for mixed diameter parts in the hopper. The tendency is to lift the smaller diameter parts first. It should also be appreciated that the utility of the present apparatus is expanded since drills of varying diameters and lengths may readily be intermixed and fed.

The base assembly 14 is provided with side walls 178 and 180 and a back wall 182 upstanding from a lower plate 184. An upper plate 186 adds rigidity to the assembly. The lower plate and upper plate are provided with cutouts 188 and 190 for receiving the lower and upper portions of the lift cylinder. The base plate 26 of the hopper assembly 12 has laterally extending edges 194 and 196 for being received within slotted brackets 198 and 200 above the upper plate of the base assembly. A notch 204 is also provided in one edge of the base plate of the hopper assembly receiving a set screw 206 located within the edge of one of the slotted brackets of the base assembly. This arrangement accurately locates the two assemblies of the apparatus, i.e., the hopper assembly and the base assembly, with respect to each other. The lower plate of the base assembly is provided with apertures 208 to receive studs 210 upstanding from the work surface 214 of a table 216 on which it is supported for accurate placement with respect to the final position or location of the fed drill. Associated mechanisms as of the type disclosed in application entitled DRILL INSPECTION AND SORTING CELL, AUTOMATIC, in the names of Mark L. Bailey, Horst W. Neu, and Deanna C. Silverman, U.S. Ser. No. 7/069,339, filed concurrently herewith, may then inspect and feed the transported drill for further use, inspection, repair, storage, or the like.

FIG. 6 illustrates an alternate embodiment of the hopper assembly. According to that embodiment, a single, rather than double, sloping floor 228 is provided with the lifting blade 244 located in a slot 232 between an adjacent side wall 220 and the lowermost edge of the sloping floor. The edge of the floor defining the slot is preferably chambered so as to be vertical, parallel with the movement of the lifting blade. The mode of operation and other structural components of this second or alternate embodiment are essentially the same as that described with respect to the first or primary embodiment.

The present disclosure includes that information contained in the appended claims as well as that in the foregoing description. Although the invention has been described in its preferred forms or embodiments with a certain degree of particularity, it is understood that the present disclosure of the preferred forms has been made only by way of example and that numerous changes in the details of construction fabrication and use including the combination and arrangement of parts and steps, may be resorted to without departing from the spirit and scope of the appended claims.

What is claimed is:

1. Apparatus for dispensing and transporting drill bits in serial fashion in a drill inspection and sorting system, to an inspection station, comprising;
   a hopper for containing a supply of drill bits, said hopper being formed of generally vertical walls for confining the supply of drill bits contained therein and a floor generally angled relative to the walls to orient and position drill bits contained therein, said hopper including an elongated horizontally extending opening at the lowermost portion of said angled floor, said floor providing a gravity feed of drill bits toward said opening,
   a drill dispensing plate positioned to extend within said opening in said hopper and having an upper surface for engaging, elevating and supporting single drill bits in serial fashion from a first lower, drill engaging position within the supply of drills contained in the hopper to a second higher and extended position above the supply of drills contained in said hopper,
   drive means operatively associated with said hopper and said drill dispensing plate for positioning said drill dispensing plate to engage a single drill bit among other drill bits of varying diameters and lengths in said hopper and for elevating such engaged drill bit to an extended position above the supply of drills contained in said hopper,
   a drill positioning member located adjacent and axially offset from the location of a drill bit supported by said drill dispensing plate in the extended drill supporting position, and adapted for axially positioning between a first unengaged position to a second engaged position for axially positioning an engaged drill bit from position on said drill dispensing plate for inspection at the inspection position,
   stop means associated with said drill dispensing plate and said drill positioning member for engaging a drill bit and for positioning such engaged drill bit at the inspection station,
   drive means for positioning said drill positioning member to engage a drill bit on the drill dispensing plate and to position such drill bit to an axially displaced location against said stop means, and
   control means for actuating said dispensing plate drive means to engage a drill bit on said dispensing plate and for positioning said plate in the extended position, said control means maintaining aid drill dispensing plate in the extended position while sequentially actuating said drill positioning member to engage and position a supported drill against said stop means in inspection position, said control means releasing said drill positioning member and said drill dispensing plate to the drill engaging position in said hopper to provide a systematic flow of drill bits from within said hopper.

2. Apparatus for dispensing and transporting drill bits in serial fashion in a drill inspection and sorting system, to an inspection station, comprising:
   a hopper for containing a supply of drill bits, said hopper being formed of generally vertical walls for confining the supply of drill bits contained therein and a floor generally angled relative to the walls to orient and position drill bits contained therein, said hopper including an elongated horizontally extending opening at the lowermost portion of said angled floor, said floor providing a gravity feed of drill bits toward said opening,
   a drill dispensing plate positioned to extend within said opening in said hopper and having an upper surface formed with a notch for engaging, elevating and supporting single drill bits in serial fashion from a first lower, drill engaging position within the supply of drills contained in the hopper to a second higher and extended position above the supply of drills contained in said hopper, said notch being sized to support only a single drill of those varying sizes of drills contained in said hopper, drive means operatively associated with said hopper and said drill dispensing plate for positioning said drill dispensing plate to engage a single drill bit among other drill bits of varying diameters and lengths in said hopper and for elevating such engage drill bit to an extended position above the supply of drills contained in said hopper, a drill positioning member located adjacent and axially offset from the location of a drill bit supported by said drill dispensing plate in the extended drill supporting position, and adapted for axial positioning between a first unengaged position to a second engaged position for axially positioning an engaged drill bit from position on said drill dispensing plate for inspection at the inspection position, stop means associated with said drill dispensing plate and said drill positioning member for engaging a drill bit and for positioning such engaged drill bit at the inspection station, drive means for positioning said drill positioning member to engage a drill bit on the drill dispensing plate and to position such drill bit to an axially displaced location against said stop means, and control means for actuating said dispensing plate drive means to engage a drill bit on said dispensing plate and for positioning said plate in the extended position, said control means maintaining said drill dispensing plate in the extended position while sequentially actuating said drill positioning member to engage and position a supported drill against said stop means in inspection position, said control means releasing said drill positioning member and said drill dispensing plate to the drill engaging position in said hopper to provide a systematic flow of drill bits form within said hopper.

3. Apparatus for dispensing and transporting drill bits in serial fashion in a drill inspection and sorting system, to an inspection station, comprising:

a hopper for containing a supply of drill bits, said hopper being formed of generally vertical walls for confining the supply of drill bits contained therein and a floor generally angled relative to the walls to orient and position drill bits contained therein, said hopper including an elongated horizontally extending opening at the lower most portion of said angled floor, said floor providing a gravity feed of drill bits toward said opening, a base member supported in operative relationship with the active components of the drill inspection and sorting system and adapted to receive a hopper containing a supply of drill bits, slide means associated with said hopper and said base member for removably supporting said hopper on said base member including locking means for securing said hopper on said base member when the hopper is in the operating position, a drill dispensing plate positioned to extend within said opening in said hopper and having an upper surface formed with a notch for engaging, elevating and supporting single drill bits in serial fashion from a first lower, drill engaging position within the supply of drills contained in the hopper to a second higher and extended position above the supply of drills contained in said hopper, said notch being sized to support only a single drill of those varying sizes of drills contained in said hopper, drive means operatively associated with said hopper and said drill dispensing plate for positioning said drill dispensing plate to engage a single drill bit among other drill bits of varying diameters and lengths in said hopper and for elevating such engaged drill bit to an extended position above the supply of drills contained in said hopper, a drill positioning member located adjacent and axially offset from the location of a drill bit supported by said drill dispensing plate in the extended drill supporting position, and adapted for axial positioning between a first unengaged position to a second engaged position for axially positioning an engaged drill bit from position on said drill dispensing plate for inspection at the inspection position, stop means associated with said drill dispensing plate and said drill positioning member for engaging a drill bit and for positioning such engaged drill bit at the inspection station, drive means for positioning said drill positioning member to engage a drill bit on the drill dispensing plate and to position such drill bit to an axially displaced location against said stop means, and control means for actuating said dispensing plate drive means to engage a drill bit on said dispensing plate and for positioning said plate in the extended position, said control means maintaining said drill dispensing plate in the extended position while sequentially actuating said drill positioning member to engage and position a supported drill against said stop means in inspection position, said control means releasing said drill positioning member and said drill dispensing plate to the drill engaging position in said hopper to provide a systematic flow of drill bits from within said hopper.

* * * * *

UNITED STATES PATENT AND TRADEMARK OFFICE
CERTIFICATE OF CORRECTION

PATENT NO. : 4,809,882
DATED     : Mar. 7, 1989
INVENTOR(S) : Horst W. Neu

It is certified that error appears in the above-identified patent and that said Letters Patent is hereby corrected as shown below:

On the Title Page, Item [75],
   In the identification of the inventors on page 1 of
   the patent, show as follows:

Horst W. Neu, Torrance, Calif.
   Deanna C. Silverman, Torrance, Calif.

Signed and Sealed this

Nineteenth Day of September, 1989

Attest:

DONALD J. QUIGG

Attesting Officer

Commissioner of Patents and Trademarks